United States Patent [19]

Hutschenreuter et al.

[11] Patent Number: 4,528,225
[45] Date of Patent: Jul. 9, 1985

[54] EASILY PEELABLE SAUSAGE CASING HAVING A GLUED SEAM, PROCESS FOR ITS MANUFACTURE, AND ITS USE

[75] Inventors: Elfriede Hutschenreuter, Bad Schwalbach; Klaus Andrae, Zornheim; Klaus Heyse, Bad Soden, all of Fed. Rep. of Germany

[73] Assignee: Hoechst Aktiengesellschaft, Frankfurt am Main, Fed. Rep. of Germany

[21] Appl. No.: 517,026

[22] Filed: Jul. 25, 1983

[30] Foreign Application Priority Data

Jul. 30, 1982 [DE] Fed. Rep. of Germany ....... 3228514

[51] Int. Cl.³ ............................................. F16L 11/00
[52] U.S. Cl. .................................... 428/36; 138/118.1; 138/156; 138/170; 426/105; 426/135
[58] Field of Search ...................... 138/118.1, 156, 170; 428/36; 426/105, 135

[56] References Cited

U.S. PATENT DOCUMENTS

| 2,573,956 | 11/1951 | Daniel, Jr. et al. | 117/76 |
| 2,607,696 | 8/1952 | Kunz | 99/171 |
| 2,819,488 | 1/1958 | Gimbel | 17/42 |
| 2,926,154 | 2/1960 | Keim | 260/29.2 |
| 3,378,379 | 4/1968 | Shiner et al. | 99/176 |
| 3,594,857 | 7/1971 | Michl | 17/42 |
| 3,617,312 | 11/1971 | Rose | 99/176 |
| 3,619,854 | 11/1971 | Ilgen et al. | 17/42 |
| 3,766,603 | 10/1973 | Urbutis et al. | 17/42 |
| 3,898,348 | 8/1975 | Chiu et al. | 426/413 |
| 3,988,804 | 11/1976 | Regner et al. | 17/45 |
| 4,185,358 | 1/1980 | Regner et al. | 17/42 |
| 4,248,900 | 2/1981 | Hammer et al. | 426/105 |
| 4,396,039 | 8/1983 | Klenk et al. | 138/118.1 |
| 4,401,135 | 8/1983 | Andrae et al. | 138/118.1 |
| 4,401,136 | 8/1983 | Porrmann et al. | 138/118.1 |
| 4,410,011 | 10/1983 | Andrae et al. | 138/118.1 |

FOREIGN PATENT DOCUMENTS

| 0037543 | 10/1981 | European Pat. Off. |
| 0054162 | 6/1982 | European Pat. Off. |
| 865727 | 4/1961 | United Kingdom |
| 908205 | 10/1962 | United Kingdom |
| 1417419 | 12/1972 | United Kingdom |
| 2035842 | 6/1980 | United Kingdom |
| 1584435 | 2/1981 | United Kingdom |

OTHER PUBLICATIONS

Andrae et al., Ser. No. 498,474=EP-OS 0,037,543.
Porrmann et al., Ser. No. 498,524=EP-OS 0,054,162.

Primary Examiner—John E. Kittle
Assistant Examiner—James J. Seidleck
Attorney, Agent, or Firm—Schwartz, Jeffery, Schwaab, Mack, Blumenthal & Evans

[57] ABSTRACT

Disclosed is a tubular sausage casing of a cellulose material having a longitudinal seam region whereat is located a smoke-permeable adhesive-containing layer of a substantially water-insoluble cationic resin which is a condensation product of a polyamide-polyamine, an aliphatic polyamine or polyamide with bifunctional halohydrin or derivative thereof. The casing also includes a coating on its inside surface of an oily emulsion having a first component comprising a water-soluble cellulose ether or a water-soluble modified starch, and a second component comprising an oil and an emulsifier. Also disclosed is a process for producing this casing and sausage products made therefrom.

17 Claims, 2 Drawing Figures

EASILY PEELABLE SAUSAGE CASING HAVING A GLUED SEAM, PROCESS FOR ITS MANUFACTURE, AND ITS USE

BACKGROUND OF THE INVENTION

The present invention relates to a tubular casing having a glued seam which exhibits advantageous adhesive and peelability properties. The present invention also relates to a process for the manufacture of the casing and its use as a sausage casing in the production of sausages.

Sausage casings having a glued seam are produced by folding a web into a tube along its longitudinal axis and gluing the overlapping edge zones running parallel to the longitudinal axis. Sausage casings of this type are described in European Offenlegungsschriften No. 0 037 543 and 0 054 162.

According to U.S. Pat. No. 2,607,696, an edge zone of a web of regenerated cellulose is provided with an acid aqueous solution of a partially polymerized, thermosetting urea/formaldehyde resin or melamine/formaldehyde resin, and the other edge zone of the web is then pressed together with the resin layer to form a tube. Subsequently, the overlapping edge zones are joined to one another at about 180° to 220° C. under the action of pressure, whereby the resin is thermoset. The resulting tubular casing can be used as a sausage casing for the production of small skinless sausages, in which the tubular casing can be peeled from the sausage after the boiling step.

This old process, which has been known for about 30 years, does not find any degree of applicability today, primarily because the overlapping seam is not of sufficient strength to withstand today's processing demands. For example, because of the relatively low breaking strength of the seam, there is an increased risk of bursting of the sausages made with this casing. In addition to the strength considerations, the known tubular casing can be manufactured only by a relatively complicated method. Furthermore, the high temperatures during gluing lead to an undesirable loss of water and to a permanent deteriorioration of the physical properties of the web material, so that the tubular casing obtained is not suitable, for example, for the subsequent shirring necessary to produce shirred casings, hereinafter referred to as shirred sticks. On the other hand, heating to temperatures of above 180° C. is necessary after the application of adhesive, in order to obtain any bond at all between the mutually overlapping edge zones of the web. Additionally, the ease of peeling of these sausage casings is unsatisfactory, and there is no suggestion to apply an internal coating in order to improve the ease of peeling.

Because of these disadvantages, tubular casings for foodstuffs, in particular artificial sausage casings have been manufactured predominantly from seamless material, although some disadvantages must be accepted in the case of these seamless tubular casings. In particular, this process is very cost-intensive. Another disadvantage is the presence of weakened zones, so-called extrusion edges, which run parallel to the longitudinal axis in the edge region on the edges which result from the tube being laid flat during the regeneration. Moreover, the stretching processes which are customary with seamless tubes also have disadvantages.

The internal coating which is required if a seamless tubing is to be used as an easily peelable sausage casing has to be applied to the inside of the seamless tube by a technically complicated process which is susceptible to disturbances. For example, the solution or dispersion must be introduced into the tubing by a time-consuming, separate process step, whereby it is necessary to cut the tubing open. Moreover, so far no suitable internal coating has been proposed which improves the peelability of casings with a glued seam, and in particular, no coating of this type has been proposed which does not negatively affect the adhesive present in the seam zone. U.S. Pat. No. 3,898,348 discloses the use of cellulose ethers, together with an oil, for internally coating tubings. In this process, a homogeneous, aqueous emulsion must be applied and the amount of the oil component must be small, as compared with the amount of cellulose ether. This coating cannot be used for glued tubings, however, because it significantly reduces the strength of the glued seam.

SUMMARY OF THE INVENTION

It is, therefore, an object of the present invention to produce an easily peelable sausage casing made of cellulose, or of fiber-reinforced cellulose, and having a glued seam, which exhibits preferred adhesive and peelability properties by the selection of an adhesive and coating material which coexist on the internal surface of the casing without detrimentally affecting each other.

A further object of the invention is the production of a tubular casing which can withstand relatively high mechanical and thermal stresses in the region of the glued seam, for example, elongation stresses and the action of hot water.

A still further object is the production of such a tubing which does not impair the flavor and appearance of the foodstuff contained therein.

Another object is to provide a tubular casing which is capable of being shirred by means of conventional shirring devices to produce shirred sticks.

A particularly important object is to provide a casing which is adequately permeable to gas and smoke in the gluing region, while simultaneously having a high tear strength and easy peelability. Such a casing is envisaged for foodstuffs which are to be smoked, for example, for special cooked sausages or hard smoked sausages, the casing of which must be capable of being peeled from the sausages.

Another important object of the present invention is to provide a sausage casing having a glued seam, made of fiber-reinforced regenerated cellulose, wherein the stability of the glued seam is not reduced by the internal coating intended for improving the ease of peeling.

It is another object of the invention to provide a process for forming a casing having a glued seam at normal ambient temperatures and with short residence times for the drying of the adhesive without any additional adhesion promoter.

It is a further object of the invention to provide a straight, essentially curvature-free and crease-free tubular casing which has a seam and which, even under the action of water and upon shrinking, retains its curvature-free and crease-free form, even in the seam region, in spite of the relatively large thickness of the casing in this region.

A still further object of the invention is the provision of an opening aid which enables the casing to be removed from the contents more easily and more hygienically, without the necessity of providing weak points on the tubular casing.

In accomplishing the foregoing and other objectives, there is provided in accordance with one aspect of the present invention a sausage casing, comprising a cellulose film curved around the longitudinal axis of the film wherein the edges of the film form a seam parallel to the longitudinal axis, a smoke-permeable adhesive-containing layer in the region of the film edges comprising a substantially water-insoluble cationic resin, said resin being a condensation product of a polyamide-polyamine, an aliphatic polyamine or polyamide with bifunctional halohydrins or derivatives thereof, and a coating on the inside surface of the curved film of an oily emulsion comprising a first component selected from a water-soluble cellulose ether or water-soluble, modified starch and a second component of at least one oil selected from the group consisting of a triglyceride mixture of saturated fatty acids with carbon chain lengths of about 4 to 14 carbon atoms and mineral oil, paraffin oil, natural oil and silicone oil and an emulsifier, the second component being present in an amount from about 15 to 100 times greater than the first component. An oily emulsion is an emulsion with an oily character which means that the outer matrix comprises the oil, which is the second component and in which the first component solved in water is emulgated.

In accordance with another aspect of the present invention, there is provided a process for producing a sausage casing, comprising the steps of providing a cellulose film, curving the film around its longitudinal axis to form a tube with the edge regions of the film forming a seam, applying an alkaline solution of a water-soluble condensation product selected from the group consisting of a polyamide-polyamine, an aliphatic polyamine or polyamide with bifunctional halohydrins or derivatives thereof to the edge regions to adhere the edge regions, coating the inside surface of the tubular casing with an oily emulsion, and subsequently storing the casing at temperatures of up to about 40° C. to cure and convert the condensation product into water-insoluble form.

The formation of a tubular casing with one seam or several seams running along the longitudinal axis, by gluing the edge regions of the edge zones running along the longitudinal axis is known per se, as reflected by the above-mentioned publications.

However, because of the special combination of adhesive and coating on its inside surface, the present casing surprisingly has the advantage that the adhesive and the coating do not adversely affect one another, so that it is even possible to apply them to the cellulose substrate in immediately concurrent steps. The casing advantageously retains its straight, curvature-free form under the action of heat and water, such as is the case, for example, when sausage casings are cooked and then cooled again. This is particularly surprising and unforseeable, since it would normally be expected that the casing would assume a curved shape or expand unevenly or shrink and even tend to burst, under the action of heat and water, because of the differences in wall thicknesses between the seam region and the remainder of the casing, and because of the different strength values, the water absorption capacity and the water retention capacity.

Other objects, features and advantages of the present invention will become apparent from the detailed description of preferred embodiments which follows, when considered in view of the accompanying drawings.

BRIEF DESCRIPTION OF THE DRAWINGS

The invention shall now be further explained by reference to the attached figures of drawing.

In the drawings.

DETAILED DESCRIPTION OF PREFERRED EMBODIMENTS

Figure 1:
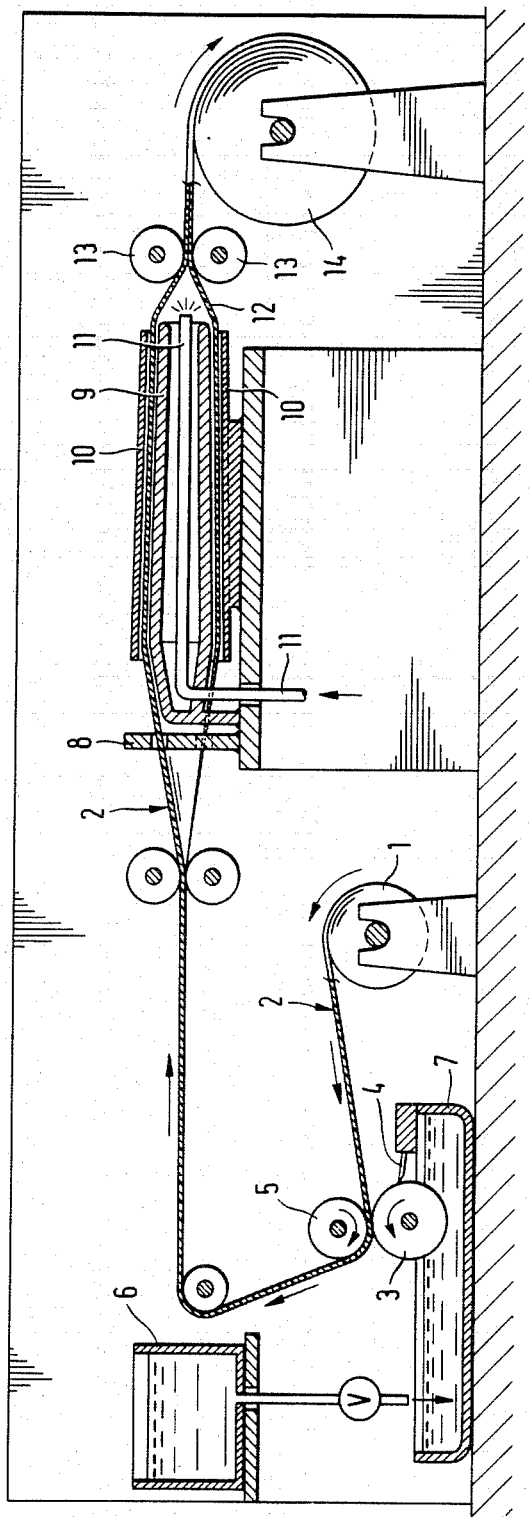
FIG. 1 is a perspective side view of one possible process for the production of the sausage casing according to the present invention.

According to the present invention, a sheet-like or web-like rectangular cut piece of film which is curved around its longitudinal axis, or a correspondingly curved cellulose film web, for example, a continuous film web, is converted into a tubular casing having a glued seam running parallel to the longitudinal axis, by overlapping and gluing the edge regions which run along the longitudinal axis with a solution or dispersion containing an adhesive, wherein no anchoring agent for the adhesive is used. Before being wound onto a roll, the tubular casing obtained is then provided on its inside surface with a coating to improve the ease of peeling.

For simplicity, in order to indicate "sheet-like or web-like cut pieces" and "continuous webs" only the term "webs" is used in the following text.

The adhesive-containing layer in the overlapping region is applied directly to the surface of the cellulose web along its edge regions, in the form of a solution or dispersion. It is also possible for the edge zones to be bonded to one another in such a way that the edges are brought together flush, that is to say with the edges at least essentially abutting, and are then bonded to one another by means of a tape, film strip or foil strip, which is referred to as a "film strip" in the following text and which covers both edge zones. The film strip may be applied to the outside or inside of the tubular casing, or to both the outside and inside of the casing in a parallel manner. One or several film strips can also be used if the edge zones overlap. Immediately before the bonding seam is made, the adhesive layer, in the form of a solution or a dispersion, is applied to the edge zones of the web, and/or, if appropriate, to the surfaces of the film strip, for example, by means of a nozzle or an applicator roll.

The film strip typically has a width of about 5 to 15 percent of the tube circumference, and preferably, is composed of the same material as the tubular casing, that is to say, it is composed of smoke-permeable cellulose, which may be fiber-reinforced, and the strength values of which in the longitudinal and transverse directions are within the same range as those of the tubing material. If, however, no particular importance is attached to a curvature-free form of the tubular casing, it is also possible to use a smoke-permeable film strip of another material, such as described in European Patent Application No. 0 037 543. It is, however, essential that the film strip, by virtue of its structure or chemical composition, be capable of allowing the smoke fumes to penetrate through the glued seam of the tubular casing.

The film strip of cellulose, which may be fiber-reinforced, can also be used as a tear-open tab for the sausage casing stuffed with a filling, the tab being peeled from the contents without great effort, as described in European Patent Application No. 0 054 162.

The forming of the web to produce a tube is carried out, for example, either on a sufficiently long path, so that distortion and formation of creases do not occur (see FIGS. 6 and 8 of European Patent Application No. 0 037 543), or by deflection over a shoulder-like forming tool (see FIGS. 3, 4 and 7 of European Patent Application No. 0 054 162). After the tube has been formed, the two lateral edges of the web adjoin one another either in an abutting or overlapping manner. By means of transport elements which grip the tube circumference, the tube is moved over the surface of a support body located in the interior of the tube. Where the edges abut, the film strip, if used, is introduced before the seam is closed, preferably with its adhesive layer facing in the direction of the inner surface of the tube, and positioned in such a manner between the surface of the support body and the abutting edges of the web that the butt seam formed by the edges of the web approximately forms the center line of the film strip, so that the film strip covers both edge zones to substantially the same width. Bonding can be effected by contact with a roll, whereby pressure may additionally be exerted on the bonding area. If desired, it is also possible to apply slight heating, in which case the bonding area is kept below 40° C., if possible. However, an application of pressure and a supply of heat are usually avoided, since these can lead to an undesired change of the web material, in particular embrittlement and drying. Excess adhesive solution can be removed from the seam region, for example, by means of a roll with a sponge-like surface or by means of scrapers. Usually, however, the water absorption capacity (swelling value) of the web material is sufficient to absorb excess aqueous solvent or dispersing agent. The web movement and gluing can take place cyclically or continuously. It is particularly surprising and not forseeable that the combination, according to the invention, of adhesive and web material leads to rapid drying of the adhesive layer, preferably even at room temperature. Room temperature is to be understood as a temperature between about 15° and 30° C. This effect has the further advantage that the resulting tubular casings can be wound up within about 1 to 3 seconds after the formation of the seam without adversely affecting the positioning of the seam.

After the seam formation, and before the tubular casing is wound onto a roll, the inside wall of the tube is coated with a composition of an oily emulsion for improving the ease of peeling, without negatively affecting the adhesion of the seam area. After a storage period of about 1 to 3 days at a temperature of up to about 40° C., but preferably at room temperature, the adhesive is fully cured and the seam can then be subjected to greater loads, for example, those which occur during the production of sausages.

Base materials used for the production of the tubular casing are webs of cellulose, that is to say of transparent cellulose film, regenerated cellulose or cellulose hydrate, which may be reinforced with a fiber insert, such as is customary for use in sausage casings (see European Patent Application No. 0 037 543). Webs of fiber-reinforced cellulose are preferably produced in accordance with the process of European Patent Application No. 0 054 162.

The adhesive of the invention is an initially water-soluble cationic resin which is applied in a solution or dispersion, advantageously in a wet layer thickness within a range of about 2 to 20 $\mu$m, in particular from about 3 to 10 $\mu$m, to the edge zones of the cellulose web, which are to be bonded to one another, immediately before or during the formation of the tube. If a film strip is used for bonding the edge zones of the cellulose web, the solution or dispersion is applied to the film strip and/or to the edge zones of the cellulose web. Adhesive is applied to both sides of the film strip, if the film strip is arranged in the overlap between the edge zones of the cellulose web.

Preferably the adhesive is applied in aqueous solution of from about 5 to 20 percent by weight strength, in particular from about 10 to 15 percent by weight strength. For simplicity, only the expression "adhesive solution" will be used in the following text.

The adhesive solution can further comprise a dye, such as for example, a pigment (NOVOFIL, made by Hoechst), and if appropriate a polyol, such as glycerol, and/or a dispersing agent for the dye. The color-coded seam zone is used, for example, for identifying the diameter of the tubular casing for further processing.

In a preferred embodiment, the resins are cured at room temperature in the alkaline range, for example, by adding concentrated ammonia solution.

The preparation of the cationic resins suitable as the adhesive is described in U.S. Pat. No. 3,378,379. The adhesives are condensation products of aliphatic polyamines or of polyamides, in particular of a polyamide-polyamine, with bifunctional halohydrins or derivatives thereof, such as, for example, epichlorohydrin, which are described in U.S. Pat. Nos. 2,926,154 and 2,573,956 or in British Pat. Nos. 865,727 and 908,205. The reaction product of an aliphatic 2,6-polyamide, diethylenetriamine and epichlorohydrin is a particularly suitable resin.

Possible polyamines are simple alkylenediamines or polyalkylene-polyamines, such as, for example, diethylenetriamine, triethylenetetramine, tetraethylenepentamine and the corresponding polypropylene-polyamines and polybutylene-polyamines, such as dibutylenetriamine. To prepare the corresponding chlorohydrin resins, the polyamines are reacted with more than one mole of epichlorohydrin per mole of polyamine. In general, from about 1.5 to 4.0 moles of epichlorohydrin, in most cases from about 2 to 3 moles, are employed. The reaction is carried out in aqueous solution at moderately elevated temperatures, about 50° C., until the desired degree of viscosity is reached. Reaction products of epichlorohydrin with dipropylenetriamine or with bis-(3-aminopropyl)-methylamine are preferably used, wherein from about 2.8 to 3.8 moles of epichlorohydrin are reacted with 1 mole of polyamine.

The polyamide-polyamines are condensation products of a saturated, aliphatic, dibasic acid which has 3 to 8 carbon atoms in the molecule, and one of the above-mentioned polyamines which has at least one secondary and two primary amino groups, such as, for example, the polyalkylene-polyamines mentioned above. It is also possible to use mixtures of these dibasic acids.

The total width of the adhesive solution applied depends on the desired strength values and the circumference of the tubular casing as well as the wet layer thickness of the adhesive solution applied. Usually, the total width of the adhesive applied will be between about 1 and 15 mm, in particular between about 2 and 3 mm, and is only a few percent of the later circumference of the tubular casing. If a film strip is used for overlapping the joint of a butt seam formed by the edge zones, application of the adhesive solution in an amount equal to twice the normal width is necessary.

It is self-evident that the adhesive solution cannot be applied over the entire area of the web, but only within the desired gluing region, that is to say, along the two edges running parallel to the longitudinal axis and/or on the surface of the film strip.

During the application of the adhesive solution, that surface of the cellulose web which is to be provided with the adhesive solution is in the dried or re-moistened state.

After the adhesive solution has been applied, for example, by means of rollers or spray nozzles, the glued seam is formed by overlapping the edge zones of the cellulose web or by overlapping the film strip with the edge zones of the cellulose web. The solvent or dispersing agent can be removed by careful heating with hot air or infrared radiators. Preferably, however, heating is not used, since it can lead to embrittlement of the cellulose material. Preferably, the solvent or dispersing agent is removed, and the resin is also cured, by the subsequent storage at room temperature for a period of about 1 to 3 days. Due to the curing of the adhesive resin, which takes place during storage, the overlapping edge zones of the cellulose web are bonded to one another, or the film strip is bonded to the edge zones. An adhesive layer thickness corresponding to a weight per unit area within the range from about 0.2 to 10 $g/m^2$ is generally adequate. The usual thickness of the adhesive layer corresponds to a weight per unit area from about 0.3 to 3 $g/m^2$ with a total width of the adhesive layer of about 1 to 15 mm. After storage, the tubular casing has a moisture content of about 4 to 15 percent, in particular from about 7 to 10 percent by weight.

It is surprising that it is not necessary to exert any pressure or to apply heat to the seam during the overlapping of the edge zones with one another or with the film strip. The combination of adhesive and web material produces extremely rapid adhesion in the gluing area, so that the tube which is formed can be wound within about 1 to 3 seconds after overlapping.

The adhesive layer can also contain further additives, for example, agents to protect this layer or the tubular casing from attack by micro-organisms, wetting agents, plasticizers such as glycerol, fillers such as kaolin, glass beads, chalk, quartz powder, micro-dolomite, barite, fine-grained sand, zinc oxide and pigments, as well as organic and inorganic dyes, for example, in the form of powder or flakes.

Moreover, the tubular casing has the advantage that the adhesive forms an adequately strong seam in the bonded webs. It has been found that this combination of cellulose web and adhesive is especially advantageous when changes in the dimensions of the casing occur, for example, during the production of sausages, when the seam is subjected to hot water for a prolonged period during the cooking of the sausage, and during shirring, stuffing, twisting, tying, clipping and the like, when the seam must withstand a high mechanical load and stresses.

It has been found that the tearing strength of glued areas has the same values, or even higher values than those of the tearing strength of the cellulose material in the transverse direction.

The coating composition for improving the ease of peeling of the sausage casing is an oily emulsion. This emulsion is comprised of two main components, the first component being a water-soluble cellulose ether or a modified water-soluble starch, and the second component being a triglyceride mixture of saturated fatty acids having carbon chain lengths of between 4 and 14 carbon atoms, mineral oil, natural oil or silicone oil. The oily emulsion further contains an appropriate emulsifier. The amount of the second, oily component contained in the composition is more than about 15 times, preferably up to about 100 times, higher than the quantity of the first component. Particularly advantageously, the second component is used in an amount which is about 30 to 80 times higher than the amount of the first component. Advantageously, the coating applied to the tubing has a total layer weight of about 1 to 5 g per $m^2$, and in particular of about 1.5 to 2 g per $m^2$, of tubing surface, and contains between about 15 and 20 $mg/m^2$ of the first component.

Cellulose ethers include: carboxymethylcellulose, alkylcellulose, such as methyl- or ethylcellulose, hydroxyalkylcellulose, such as hydroxyethyl-or hydroxypropylcellulose, alkyl-hydroxyalkylcellulose, such as methyl- or ethyl-hydroxyethylcellulose or methyl- or ethyl-hydroxypropylcellulose, alkyl-carboxymethylcellulose, hydroxyalkyl-carboxymethylcellulose and alkyl-hydroxyalkyl-carboxymethylcellulose.

Chemically modified starches include: dextrins, dextrans and starch ethers, such as carboxymethylstarch, alkylstarch, such as methyl- and ethylstarch, hydroxyalkylstarches, such as hydroxymethyl-, hydroxyethyl- and hydroxypropylstarch, alkylhydroxyalkylstarch, alkyl-carboxymethylstarch, hydroxyalkyl-carboxymethylstarch and alkyl-hydroxyalkyl-carboxymethylstarch.

The alkali metal salts, such as the sodium metal salts, shall also be included within the framework of this invention. Further, the definition "water-soluble" shall also include the alkali-soluble cellulose ethers and starch ethers.

Natural oils include vegetable oils, such as linseed oil, olive oil, sunflower oil, soybean oil, castor oil, rape oil, and coconut oil. A suitable silicone oil is, in particular, a dimethylpolysiloxane which is permitted by food laws. The preferable triglyceride mixture contains saturated fatty acids, having a chain length from about 4 to 14, preferably from about 6 to 10 carbon atoms. Such triglyceride mixtures are commercially available, for example, under the trade name of MYGLYOL or SOFTENOL made by Dynamit Nobel. The oil proportion contained in the coating may also comprise a mixture of the above-specified preferred natural oils.

Due to the preparation process, the coating contains chemical emulsifiers; however, the amounts of the emulsifiers are determined so as not to affect the desired properties of the coating or of the tubular casing having a coating on its inside surface. Examples of suitable emulsifiers include ethoxylates or propoxylates of natural, saturated and/or unsaturated, fatty acids, which are obtained, for example, by the saponification of natural oils, such as soybean oil, linseed oil, castor oil, and the like, and monoesters or diesters of natural, saturated and/or unsaturated fatty acids with polyhydric alcohols, for example, glycerol, pentaerithrytol, sorbitol, mannitol, and the like. Toxicologically harmless synthetic emulsifiers which are permitted by food laws, for example, alkyl or alkyl-aryl sulfates or sulfonates are also applicable. Ethoxylated soybean fatty acids are commercially available, for example, under the trade name of DEGLYCAL. Ethoxylated castor oil acids are sold, for example, under the trade name of CREMO- PHOR. The emulsifiers are added in amounts of from about 0.5 to 20% by weight, particularly about 2% by weight, relative to the oil component. Relatively small amounts of emulsifier will suffice.

Sorbitan fatty acid esters and also ethoxylated soybean fatty acids (52.5% linoleic acid, 33.5% oleic acid, 14% palmitic acid, linolenic acid and arachidic acid +12 moles of ethylene oxide), ethoxylated castor oil acid (86% castor oil acid, 9% oleic acid, 2 to 3% linoleic acid, 2% stearic acid +36 moles of ethylene oxide) and ethoxylated oleic acids have proven to be particularly advantageous emulsifiers.

Particularly suitable oily emulsions additionally contain about 1 to 15% of a polyol having 3 to 6 carbon atoms and at least 2 hydroxy groups. Typically suitable polyols are, for example, glycerol, propyleneglycol, triethyleneglycol and sorbitol.

For packing meat products in the form of sausage meat, shirred seamless tubular casings are used which progressively unfold as the sausage meat is supplied to the casing. These shirred casings, also called shirred sticks or hollow sticks in the trade, have hitherto been manufactured from long seamless tubings which are conveyed in the direction of their longitudinal axis and are shirred against an opposing force. The length of the shirred casing usually is only about 1 to 3 percent of the original length.

The tubular casing according to the present invention can also be shirred. This is particularly surprising due to the thickness of the casing in the region of the glued seam. In particular, difficulties would normally be expected during shirring when a film strip covering both edges is used. The tubular casing is shirred, for example, by the process disclosed in U.S. Pat. Nos. 3,988,804 and 4,185,358, and by means of the equipment described therein.

In a preferred embodiment, the shirred tubular casing has a helical twisting and, consequently, twisting of the relatively thick seam zone about the longitudinal axis of the casing. This is effected, for example, by shirring devices known per se, such as are desribed, for example, in U.S. Pat. Nos. 2,819,488, 3,619,854, 3,594,857 and 3,766,603.

The shirred tubes are filled with sausage meat of the cooked sausage type (about 20m/minute), mechanically twisted, tied or clipped, smoked, cooked at about 70° to 85° C. and cooled with water. This gives sausages with a uniform shape and a casing which intimately contacts, but is easily peelable from, the sausage meat. Examples of sausages of the cooked sausage type are lightly smoked sausage, smoked ham sausage, firm pork sausage, yellow-skin sausage, mortadella and Lyon sausage.

If the tubular casing is intended for use with sensitive foodstuffs or is to be stored with a high water content, the web or the tubular casing is sterilized. For example, heat treatment or ozone treatment, high-frequency irradiation or treatment with chemical agents, such as propylene glycol (British Pat. No. 1,584,435) or sorbate solution (U.S. Pat. No. 3,617,312), are used for this purpose.

In addition to the advantages already mentioned, it should also be pointed out that the tubular casings of the invention can be produced at a higher speed than hitherto possible. In the case of the manufacture of webs, instead of seamless tubes from regenerated cellulose by the viscose process, the extrusion process can be carried out more rapidly, as can the coating of the webs and the printing. In addition, the casing has a regular and uniform coagulated and regenerated layer of cellulose.

In addition to flexographic printing, high-grade gravure printing is also possible. Furthermore, the cut piece or the web can be printed with an allround print or with a front and back print.

The present sausage casing has the further advantage of not affecting the flavor of the sausage meat. The sausage casing and the glued seam show high strength under elongation stresses and volume stability during filling with sausage meat, handling and processing. Surprisingly, the pressure arising during filling and the swelling and shrinking forces occurring during cooking and cooling do not cause any damage to the seam. The sausage casing can also be stored at low temperatures and can easily be cut open, for which purpose the film strip can be used as a tear-open tab. The particular advantage is that the tubular casing is smoke-permeable even in the region of the adhesive layer. For example, the tubular casings filled with cooked sausage meat exhibit a uniform, typically reddish-brown smoked color after smoking.

Another essential advantage resides in the fact that the adhesive layer is not negatively affected by the proposed internal coating, while at the same time the ease of peeling of the tubular casing is considerably improved. Due to the predominantly oily character of the internal coating, any undesired soaking and moistening of the tubing material is avoided, in contrast with the predominantly aqueous dispersions known from prior processes. Furthermore, it has surprisingly been found that, when compared with known mixtures, the oily emulsion of the invention ensures extremely good peeling characteristics of the tubing, although the amount of cellulose derivatives or starch derivatives contained in it has been significantly reduced, as compared with the oily component. The application of the internal coating can be carried out by a process which is much simpler than the processes used to date, wherein the composition for improving the ease of peeling had to be introduced into a loop of the tubing or was sprayed onto the inside surface of the tubing during the shirring process, through the shirring mandrel.

Referring now to the figures, in FIG. 1, a web 2 of cellulose is passed from the stock roll 1, into an applicator unit which comprises an applicator roll 3, a doctor blade 4 and counterroll 5. The applicator roll 3 causes the adhesive solution to be applied in strips to an edge zone of the web 2. The adhesive solution is delivered from the stock vessel 6 into the trough 7. By means of the forming template 8, the support tube 9 and the contact sleeve 10, the web 2 is shaped into a tube having an overlapped longitudinal seam. The oily emulsion is introduced through a pipe 11 into the tube 12. Then the tube is laid flat by the pair of draw-off rollers 13 and conveyed to the winding-up device 14.

Figure 2:
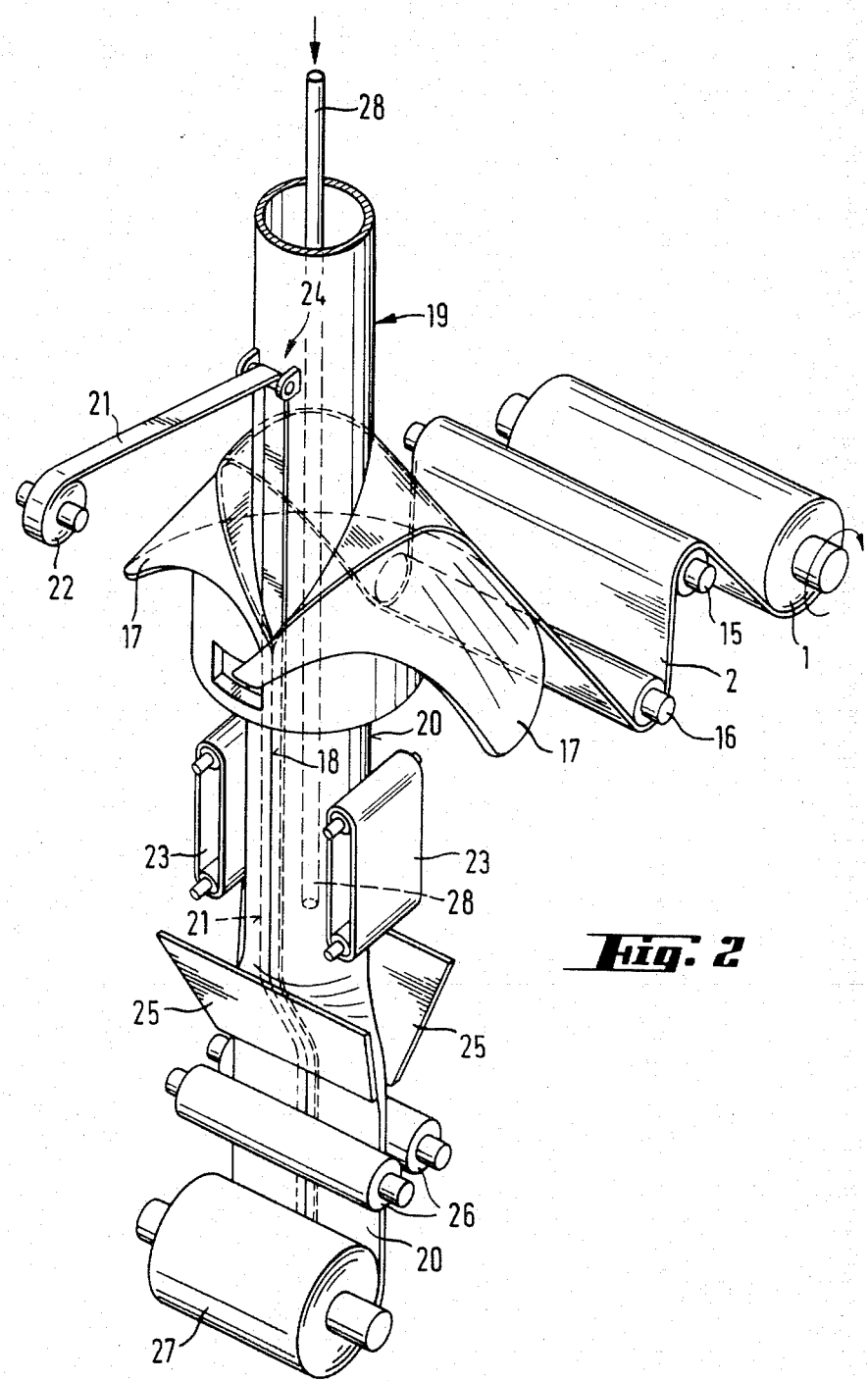
FIG. 2 is a perspective side view of another process variant.

In FIG. 2, the web 2 of cellulose is drawn from the stock roll 1 and passed over guide rollers 15 and 16 to a forming shoulder 17, where the tube 20 is formed. The two edges of the web 2 approach one another with the formation of a butt seam 18. The hollow cylindrical support element 19 is located in the interior of the tube 20. A film strip 21 composed of the web material is unwound from the roll 22 and passed over an eye-type guide element 24 into the interior of the tube 20, the butt seam 18 being located in the center of the film strip 21. The film strip 21 has been coated with an aqueous adhesive solution. On the outer surface of the tube 20, transport belts 23 push the tube 20 vertically downwardly. The tube 20 passes baffles 25, which lay the tube flat, and a pair of transport rollers 26, and the tube is then wound onto roll 27. The oily emulsion is applied through the pipe 28 located in the interior of the hollow cylindrical support element 19 to the inner surface of the tube 20. The pipe 28 ends near the baffles 25, shortly before the tube 20 is laid flat.

The invention is explained in greater detail by reference to the non-limiting examples which follow.

EXAMPLE 1

Viscose was extruded through a gap into an acid coagulation bath, where the usual coagulation and regeneration were performed to produce a cellulose hydrate gel. After passing through washing and desulphurizing baths, the web of cellulosehydrate gel was conveyed through a softener bath of a 9% by weight aqueous glycerol solution. During the production, no separate transverse stretching of the web was performed.

The web of regenerated cellulose was dried at temperatures of about 70° to not more than about 110° C. and after drying had a weight per unit area of 40 g/m$^2$, a water content of about 8% by weight and a glycerol content of about 20% by weight. If necessary, the water content can be adjusted by remoistening. The tearing strength of the web material in the transverse direction was about 75 to 85 N/mm$^2$.

The cellulose web was cut into 60 mm wide tapes. Each cut piece in the form of a tape was coated along one of its two edges with a 12 percent by weight aqueous solution (pH 7.5, adjusted with concentrated ammonia solution) of a water-soluble cationic resin in strips in the longitudinal direction of the tape. The resin used was a reaction product of ethylenediamine, adipic acid, diethylenetriamine and epichlorohydrin, which is commercially available at a 12 and 20 percent by weight aqueous solution, under the name RESAMIN HW 601 (manufacturer Cassella).

For this purpose, the solution was transferred by means of a rotating applicator roll, about 2 mm in width from a supply trough to the running film tape, the coating assuming a width of about 2 to 3 mm with a wet layer thickness of about 10 to 12 μm. The tape, which had been coated close to the edges, was formed by means of shaping aids which grip the tape on its outside and inside surfaces, into a tube having a diameter of 17 mm such that the edge coated with the solution and the uncoated edge overlapped by about 5 mm. The regions close to the edge formed in each case an overlapped glued seam running in the longitudinal direction, the result being an adhesive layer corresponding to a weight per unit area of about 1 to 2 g/m$^2$. An oily emulsion was introduced into this tube, by means of a pipe extending through the shaping aids and ending in front of a pair of squeezing rollers, by which the tube was laid flat. The oily emulsion had the following composition:

58 g of vegetable oil (C$_7$-fatty acid triglyceride, SOFTENOL 3107, made by Dynamit Nobel),
0.8 g of sorbitan monolaurate (SPAN 20, made by Atlas Chemie),
0.2 g of polyoxyethylene(20)-sorbitan-monooleate (sorbitan-monooleate-ethoxylate, TWEEN 80, made by Atlas Chemie), and
1 g of carboxymethylcellulose in 40 g of water (TYLOSE C30 NV, made by Hoechst).

About 1 to 2 seconds after the formation of the overlapping seam, the resulting tube was laid flat and wound onto a roll. On its internal surface it carried an oily emulsion having a weight of about 1.5 to 2 g/m$^2$.

After storage at room temperature for only 1 day, the glued area already had a hot-water resistance of several hours, when test specimens of 15 mm width and 50 mm clamping length, which were cut transversely to the seam, were immersed in suspension into hot water at 80° C. and loaded at the lower end with a weight of 500 g.

Tubular casings conditioned in a standard reference atmosphere (23° C., 50 percent relative humidity) had a breaking strength in the transverse direction of 50 N/mm$^2$ and a bursting pressure of more than 1 bar; tubes immersed for 30 minutes in water (20° C.) had a bursting pressure of about 0.35 to 0.45 bar. These values are adequate for small-diameter sausage casings.

The tubular casings thus produced were shirred with the device disclosed in U.S. Pat. No. 4,185,358 and were used as casings for sausage meat. For this purpose, the tubular casings were stuffed with typical sausage fillings, for example, of the Vienna or Frankfurter type, cut into portions, and smoked and cooked under known conditions. This gave small cooked sausages having a uniform typical red-brown smoked color. The glued seam withstood the forces arising during the processing. After cooling and watering for a short time, the casings were peeled from the sausages by means of an automatic peeling device. The sausages left the peeling device in a perfect state and without their own integral skin adhering to the tube or being damaged in any manner.

EXAMPLE 2

The process followed in this experiment was the same as that described in Example 1. The oily emulsion was composed of:

58.5 g of fatty acid triglyceride (SOFTENOL 3107, made by Dynamit Nobel),
0.47 g of sorbitan-monolaurate (SPAN 20, made by Atlas Chemie),
0.03 g of sorbitan-monooleate-ethoxylate (TWEEN 80, made by Atlas Chemie)
10 g of glycerol, and
1.5 g of carboxymethylcellulose in 29.5 g of water (TYLOSE C30 NV, made by Hoechst).

The sausage casing obtained had excellent peeling properties.

EXAMPLE 3

Example 1 was repeated, but with the exception that the adhesive used for the glued seam was a solution of:
94% of a cationic polyamide resin (12.5% strength in water, pH 8.5, available under the name of KYMENE 5574 H from Hercules),
5% of glycerol, and
1% of a color pigment (NOVOFIL BB02, made by Hoechst).

The solution was delivered from a pressurized stock vessel through a thin tubing to a coating nozzle, the orifice of which had a diameter of about 0.4 mm and which was positioned in the region of the forming head in such a way that the adhesive solution was released directly into the overlap region of the cellulose tape laid into the form of a tube. By selecting a suitable pressure, an approximately 1 to 3 mm wide track of the adhesive solution could be produced continuously in the overlap region, this track bonding the edge regions of the tape with an overlap. The tubing obtained was immediately treated with the oily emulsion of Example 2, laid flat and wound onto a roll.

After storage at room temperature for 3 days, a hot-water resistance of several hours had developed when test specimens, cut transversely to the seam, of 15 mm width and 50 mm clamping length were immersed by suspension into hot water of 80° C. and were loaded at their lower ends with a weight of 600 g each. The tubular casings produced in this way were shirred as described in Example 1, and sausages were prepared. The peeling properties observed during automatic peeling were excellent.

EXAMPLE 4

A web of long-fibered hemp paper having a width of 235 mm and a weight per unit area of 21 g/m$^2$ was coated on both sides with viscose. The gap width was, for example, 0.8 mm and the web speed was 5 m/min.

A fluid suitable for precipitation and regeneration was then applied to the web provided with viscose. The web width was kept constant by means of holding elements gripping the two web edges, so that the shrinkage which usually occurs on regeneration in the transverse direction was prevented. The fiber-reinforced web of cellulose hydrate gel then passed through washing and desulfurization baths. The web of cellulose hydrate gel then had a width of 210 mm.

The fiber-reinforced web of cellulose hydrate gel was drawn through a trough which contained a 3 percent by weight aqueous solution of the cationic resin used in Example 1. Subsequently, the web passed through a bath containing 15 percent by weight aqueous glycerol solution.

This was followed by a pre-drying of the web, during which the water content of the web was lowered to about 80 to 150 percent by weight. Subsequently, the web edges were gripped by holding elements and extended in the transverse direction to a width of about 252 to 262 mm. While retained at this width, the web was dried, preferably at about 80° to 110° C. The residual moisture content of the wound web was about 14 percent by weight, and exhibited a breaking strength of 52 N/mm$^2$ in the longitudinal direction and of 58 N/mm$^2$ in the transverse direction, and an elongation at break of about 17.5 percent in both directions. Its weight per unit area was about 100 g/m$^2$, and its glycerol content was about 21 percent. Layers of the cured, water-insoluble resin, having a weight per unit area of about 0.5 to 1 g/m$^2$, were present on both surfaces.

The web of fiber-reinforced regenerated cellulose was cut into tapes of 170 mm width. Such a tape was passed through a forming device to form a tube having a diameter of 50 mm with the two edges of the tape overlapping by 13 mm. The tip of a fine nozzle protruded into this overlap. A 12 percent aqueous solution of the resin mentioned in Example 1, adjusted to a pH value of 7.5 with concentrated ammonia, was injected under pressure through this nozzle to produce an about 7-8 mm wide layer of adhesive solution in the overlap region having a wet layer thickness of about 10 μm, to bond the regions of the tape close to the edges. The inside surface of the tube continuously formed and provided with a glued seam running in the longitudinal direction was then immediately coated with an oily emulsion as described in Example 1, laid flat and wound onto a roll, without the overlapping edge zones being repositioned.

After storage for 2 days in a standard reference atmosphere, the glued seam had a hot-water resistance of more than 1 hour, when test strips of 50 mm clamping length and 15 mm width, cut transversely to the seam, were immersed in suspension into hot water of 80° C. and were loaded with a weight of 1,000 g. After soaking with water for 30 minutes in a water bath, the tube had a bursting pressure of 1.2 bar.

In the tensile test, conditioned samples cut transversely to the seam had a tearing strength of about 57 to 58 N/mm$^2$ in the transverse direction, that is to say, they reached the original strength of the material in the seam region.

The tubes obtained were shirred by means of the shirring device disclosed in U.S. Pat. No. 4,185,358 or, respectively, casings closed at one end were prepared.

Sections of the tubes thus produced were filled by means of a customary sausage-filling device with a sausage meat for cooked sausages (for example, Lyon sausage, lightly smoked sausage, or mortadella) under a filling pressure of 0.3 bar, and the open ends were closed by tying or clipping. Subsequently, the sausages obtained were smoked in the conventional manner, for example, in moist smoke at about 70° to 80° C. for about 10 to 60 minutes, and cooked for an additional 10 minutes in water of about 80° to 82° C., and then cooled and stored in the cold chamber. In the case of salami fillings, the sausages were smoked and dried.

After initial cutting, the sausage casings could be peeled from the sausages without effort. Moreover, even in the seam region, the sausages showed a uniform smoked coloration. The glued seam was stable with regard to the mechanical and thermal stresses during processing and storage.

What is claimed is:

1. A sausage casing, comprising:
    a cellulose film curved around the longitudinal axis of said film so that the edges of said film form a seam parallel to the longitudinal axis;
    a smoke-permeable adhesive-containing layer in the region of said film edges consisting essentially of a substantially water-insoluble condensation product of a polyamide-polyamine, an aliphatic polyamine or polyamide with a bifunctional halohydrin or a derivative thereof, said condensation product joining said film edges at said seam; and
    a coating on the inside surface of said curved film of an oily emulsion comprising (a) a first component selected from a water-soluble cellulose ether or water-soluble modifed starch, (b) a second component comprising at least one oil selected from the group consisting of a triglyceride mixture of saturated fatty acids with carbon chain lengths of about 4 to 14 carbon atoms, mineral oil, paraffin oil, natural oil and silicone oil, and (c) an emulsifier, said second component being present in an amount from about 15 to 100 times greater than said first component.

2. A sausage casing as claimed in claim 1, wherein said edge regions overlap and said adhesive layer is located between the mutually overlapping regions.

3. A sausage casing as claimed in claim 1, wherein said edge regions abut each other and further comprising at least one smoke-permeable film strip for covering said abutting edge regions and having said adhesive-containing layer located between the film strip and the edge regions.

4. A sausage casing as claimed in claim 3, wherein said film strip is positioned on the inside of said casing.

5. A sausage casing as claimed in claim 3, wherein said film strip is positioned on the outside of said casing.

6. A sausage casing as claimed in claim 3, wherein said film strip is positioned on the inside surface and another film strip on the outside surface of said casing.

7. A sausage casing as claimed in claim 2, further comprising a smoke-permeable film strip running parallel to the longitudinal axis positioned between said overlapping edge regions and an adhesive containing layer between the film strip and each of said edge zones.

8. A sausage casing as claimed in claim 1, wherein said first component comprises carboxymethylcellulose and said second component comprises vegetable oil.

9. A sausage casing as claimed in claim 1, wherein said cellulose film comprises fiber-reinforced cellulose.

10. A sausage casing as claimed in claim 1, wherein said second component is present in an amount from about 30 to 80 times that of said first component.

11. A sausage casing as claimed in claim 1, wherein said oily emulsion has a weight per unit area of about 1 to 5 g/m$^2$ and wherein said first and second components comprise from about 50 to 70 percent of said emulsion.

12. A sausage casing as claimed in claim 11, wherein said oily emulsion has a weight per unit area of about 1.5 to 2 g/m$^2$.

13. A sausage casing as claimed in claim 1, wherein said casing is shirred and edge regions are arranged helically around the longitudinal axis of said shirred casing.

14. A sausage casing as claimed in claim 1, wherein said adhesive containing layer has a wet layer thickness from about 2 to 20 $\mu$m.

15. A sausage casing as claimed in claim 14, wherein said wet layer thickness ranges from about 3 to 10 $\mu$m.

16. A smoked sausage product comprising a tubular artificial sausage casing as defined in claim 1 containing therein a semi-solid sausage filling.

17. A small sausage product containing an integral sausage casing as defined in claim 1 containing therein a semi-solid sausage filling.

* * * * *